US007694612B2

(12) United States Patent
Ishibuchi et al.

(10) Patent No.: US 7,694,612 B2
(45) Date of Patent: Apr. 13, 2010

(54) CONTROL DEVICE FOR CUT-OFF APPARATUS

(75) Inventors: Hiroshi Ishibuchi, Hiroshima (JP); Satoshi Matsuda, Aichi (JP); Kuniaki Wakusawa, Hiroshima (JP); Katsuaki Takasaki, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/414,783

(22) Filed: Mar. 31, 2009

(65) Prior Publication Data

US 2009/0188360 A1 Jul. 30, 2009

Related U.S. Application Data

(62) Division of application No. 10/572,856, filed as application No. PCT/JP2005/008184 on Apr. 28, 2005.

(30) Foreign Application Priority Data

Sep. 8, 2004 (JP) ............................ 2004-260928

(51) Int. Cl.
*B23Q 15/00* (2006.01)

(52) U.S. Cl. ............................... 83/72; 83/76.1; 83/342

(58) Field of Classification Search ................... 83/342, 83/61, 62, 62.1, 65, 68, 72–75, 75.5, 76, 83/76.1, 76.6–76.9, 672, 469, 443, 343
See application file for complete search history.

(56) References Cited

U.S. PATENT DOCUMENTS 3,411,388 A * 11/1968 Rappaport ..................... 83/76
3,424,041 A * 1/1969 Giraud .......................... 83/76
3,521,529 A * 7/1970 Strand .......................... 83/76
3,581,613 A * 6/1971 Deems .......................... 83/76
3,668,957 A * 6/1972 Nido ............................ 83/37
4,020,406 A * 4/1977 Tokuno et al. .............. 318/600

(Continued)

FOREIGN PATENT DOCUMENTS

JP 60255309 12/1985

(Continued)

*Primary Examiner*—Phong H Nguyen
(74) *Attorney, Agent, or Firm*—Kanesaka Berner & Partners, LLP

(57) ABSTRACT

Torque necessary for cutting band-like paper is properly distributed to both of the preceding motor and the following motor, thereby making it possible to accurately cut the band-like paper. The cut off method for a cut off apparatus including: a preceding knife cylinder on whose peripheral surface a preceding helical knife is provided; a following knife cylinder on whose peripheral surface a following helical knife, which cuts off band-like paper D in cooperation with the preceding knife, is provided; a preceding knife driving motor which rotationally drives the preceding knife cylinder; a following knife driving motor which rotationally drives the following knife cylinder; and a cut off control device which individually controls the preceding knife driving motor and the following knife driving motor, is characterized in that the method comprises: giving, when the band-like paper D is cut, the preceding knife and the following knife a specified amount of torque in the direction in which the preceding knife and the following knife are pressed against each other, by means of the preceding knife driving motor and the following knife driving motor.

7 Claims, 5 Drawing Sheets

U.S. PATENT DOCUMENTS

| | | | | |
|---|---|---|---|---|
| 4,724,732 | A | 2/1988 | Miyauchi et al. | |
| 4,809,573 | A * | 3/1989 | Welch | 83/76 |
| 6,139,938 | A | 10/2000 | Lingle et al. | |
| 6,155,151 | A | 12/2000 | Reichert | |
| 6,389,941 | B1 * | 5/2002 | Michler | 83/74 |

FOREIGN PATENT DOCUMENTS

| | | | |
|---|---|---|---|
| JP | 61131816 | A | 6/1986 |
| JP | 11090888 | A | 4/1999 |
| JP | 2002284430 | A | 10/2002 |
| JP | 2003127023 | A | 5/2003 |

* cited by examiner

CONTROL DEVICE FOR CUT-OFF APPARATUS

RELATED APPLICATIONS

The present application is a divisional of U.S. application Ser. No. 10/572,856 filed Mar. 22, 2006, which is a National Phase of International Application No. PCT/JP05/08184 filed Apr. 28, 2005, and claims priority from, Japanese Application Number 2004-260928, filed Sep. 8, 2004. The disclosures of all above listed applications are hereby incorporated by reference herein in their entirety.

FIELD OF THE INVENTION

The present invention relates to a cut off method and apparatus for band-like paper, such as a corrugated fiberboard web, and a control apparatus for the same in a corrugating machine which manufactures corrugated fiberboard sheets, etc.

BACKGROUND OF THE INVENTION

In a previous cut off apparatus in a corrugating machine, various attempts have been made to reduce the rigidity of knife cylinders and to realize a specified pressing force between knives. In FIG. 8, for example, the cut off apparatus includes: an upper knife cylinder 53 to which an upper knife 55 and split gears 8*a* and 8*b* are attached; a lower knife cylinder 54 to which a lower knife 56, which cuts a corrugated fiberboard web in cooperation with the upper knife 55, and a lower gear 9 which has a meshing engagement with the split gears 8*a* and 8*b* are attached; main drive motor 51 and an auxiliary drive motor 50 which rotationally drive the knife cylinders 53 and 54; and a controller 52 which controls the drive motors 51 and 50. Clearance is formed between the teeth of the split gears 8*a* and 8*b* and the teeth of the lower gear 9, which teeth have a meshing engagement with one another when the upper and lower knives 55 and 56 come into contact with each other. The controller 52 controls at least either one of the drive motors 51 and 50 so that a pressing force is applied between the knives 55 and 56 when these knives come into contact with each other (for example, the following patent document 1).

[Patent document 1] Japanese Patent Application Laid-open No. 2002-284430

DISCLOSURE OF THE INVENTION

Problems to be Solved by the Invention

However, the controller 52 in the above patent document 1 only performs torque control in such a manner that a pressing force is generated so that the upper knife 55 is pressed against the lower knife 56. Thus, it is difficult to accurately cut off band-like paper such as a corrugated fiberboard sheet. Further, the rated power capacities (size) of the upper motor and the lower motor are different, so that the number of types of components including a control device is increased.

With the foregoing problems in view, it is an object of the present invention to provide a cut off method and apparatus for band-like paper and a control apparatus for the same, in which torque necessary for cutting off the band-like paper is properly distributed to the upper (preceding) and the lower (following) motor, so that the band-like paper such as a corrugated fiberboard sheet is accurately cut off. Further it is another object of the present invention to reduce the number of types of components by equalizing the rated power capacities of the upper motor and the lower motor.

Means to Solve the Problems

A cut off control device for band-like paper controls a preceding knife driving motor for rotationally driving a preceding knife cylinder on whose peripheral surface a preceding helical knife is provided and also a following knife driving motor for rotationally driving a following knife cylinder on whose peripheral surface a following helical knife is provided. The control device comprises: a speed pattern generator, to which a paper feeding speed of the band-like paper and the sheet length to be cut off is input, for generating rotational speed patterns of the preceding knife driving motor and the following knife driving motor based on the input paper feeding speed and the input sheet length to be cut off and for outputting a speed instruction value; a comparator which compares the speed instruction value from the speed pattern generator with a detected speed of the preceding knife driving motor or the following knife driving motor; an instruction torque computing unit which computes rotational torque instruction values for the preceding knife driving motor and the following knife driving motor based on a signal from the comparator; a cutting torque computing unit which computes cutting torque of the preceding knife driving motor and the following knife driving motor; a to-be-given torque pattern generator which distributes the cutting torque sent from the cutting torque computing unit, and generates a to-be-given torque pattern based on the paper feeding speed of the band-like paper and the sheet length to be cut off, and outputs a to-be-given torque instruction value; an instruction torque subtractor unit which subtracts the to-be-given torque instruction value, output from the to-be-given torque pattern generator, from the rotational torque instruction value computed by the instruction torque computing unit; a preceding power amplifier which controls the preceding knife driving motor based on a computation result obtained by the instruction torque subtractor; an instruction torque adder which adds the rotational torque instruction value, computed by the instruction torque computing unit, to the to-be-given torque instruction value computed by the to-be-given torque pattern generator; and a following power amplifier which controls the following knife driving motor based on a computation result obtained by the instruction torque adder.

According to embodiments of the invention as set forth herein, the to-be-given torque pattern generator distributes cutting torque necessary for cutting off the band-like paper, thereby controlling the preceding knife driving motor or the following knife driving motor. Thus, paper feeding of the band-like paper is not influenced, so that it is possible to cut off the band-like paper accurately.

BEST MODE FOR CARRYING OUT THE INVENTION

Figure 1:
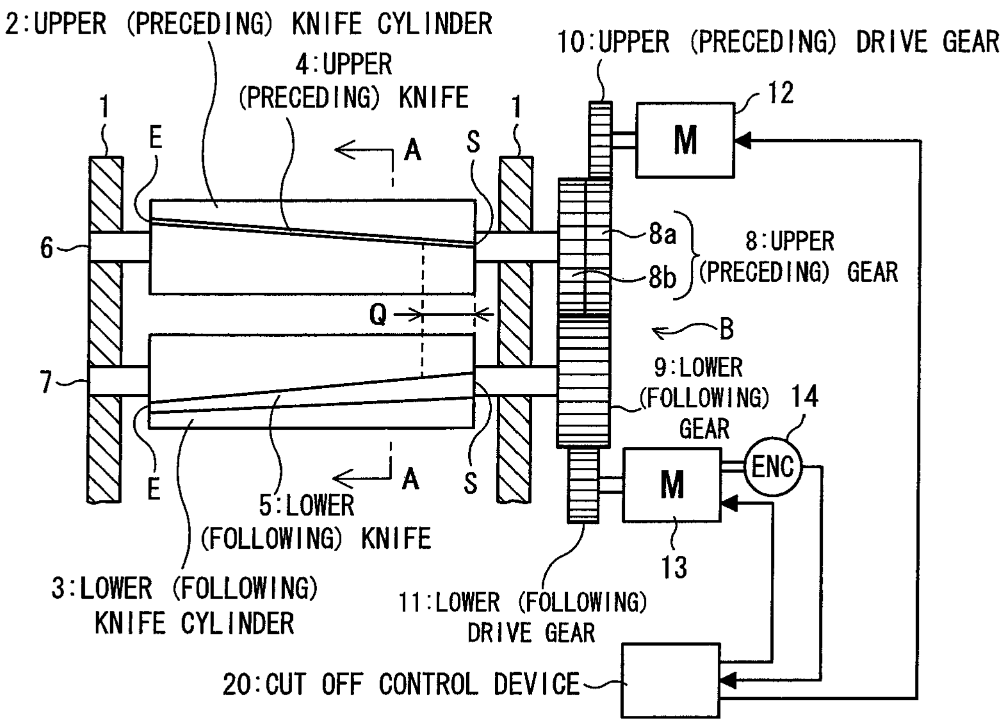
FIG. 1 is a schematic front view of a cut off apparatus according to one preferred embodiment of the present invention.
Figure 2:
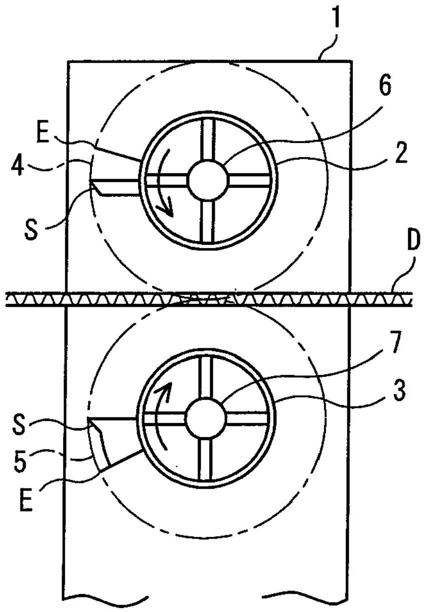
FIG. 2 is a section taken along the arrow line A-A of FIG. 1.
Figure 3:
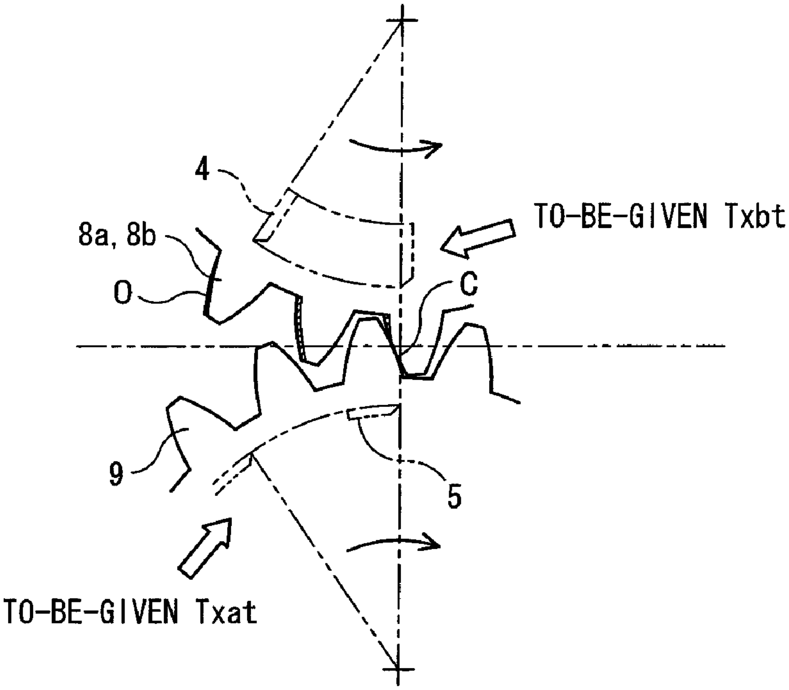
FIG. 3 is a schematic side view showing the state of the upper and the lower gear at the time the upper and lower knives of the cut off apparatus of the present embodiment start a cut off operation.
Figure 4:
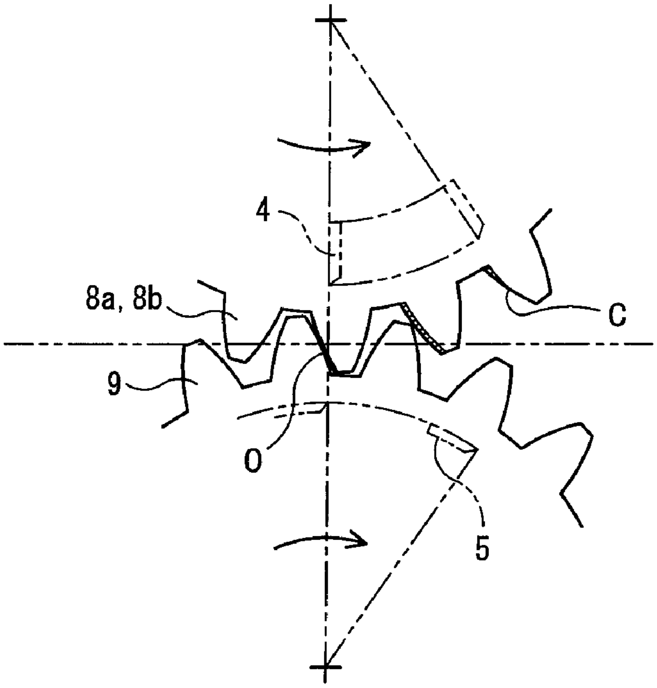
FIG. 4 is a schematic side view showing the state of the upper and the lower gear at the time the upper and lower knives of the cut off apparatus of the present embodiment complete the cut off operation.
Figure 5:
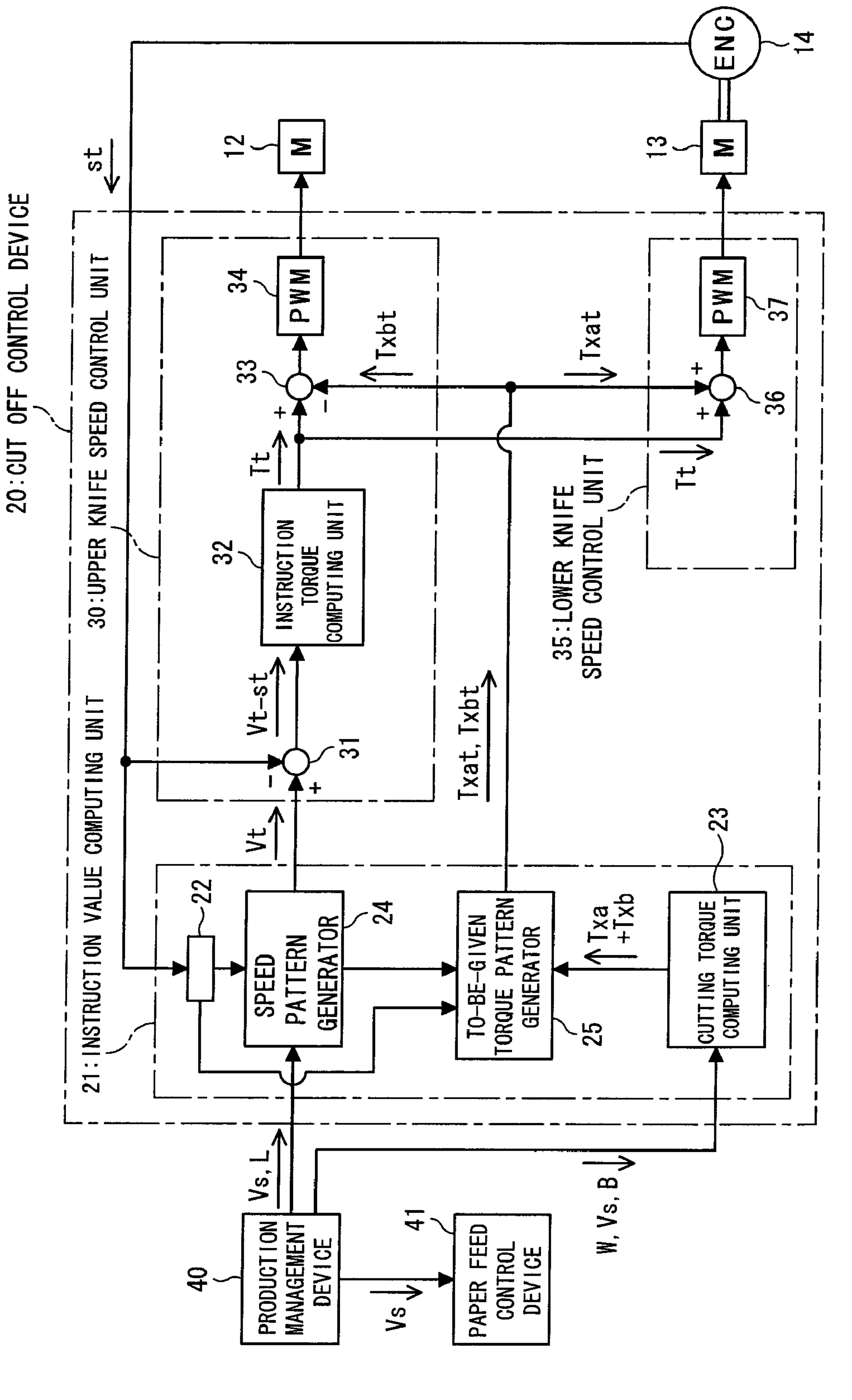
FIG. 5 is a control block diagram showing a cut off control device according to the present embodiment.

A description will be made hereinbelow of a best mode for carrying out the invention. FIG. 1 is a schematic front view of a cut off apparatus according to one preferred embodiment of the present invention; FIG. 2 is a section taken along the arrow line A-A of FIG. 1; FIG. 3 is a schematic side view showing the state of the upper and the lower gear at the time the upper and lower knives of the cut off apparatus of the present embodiment start a cut off operation; FIG. 4 is a schematic side view showing the state of the upper and the lower gear at the time the upper and lower knives of the cut off apparatus of the present embodiment complete the cut off operation; FIG. 5 is a control block diagram showing a cut off control device according to the present embodiment; FIG. 6(A) through FIG. 6(E) are diagrams each showing a control pattern for each knife driving motor according to the present embodiment; FIG. 7 is a diagram showing another example of a pressure torque (to-be-given torque) pattern given by each knife driving motor according to the present invention.

First of all, referring to FIG. 1 and FIG. 2, a description will be made of a construction of a cut off apparatus for cutting off band-like paper D such as a corrugated fiberboard web in a corrugating machine. As shown in FIG. 1 and FIG. 2, parallel rotational axes 6 and 7 are provided, passing through the frames 1 and 1 on both sides. Here, the rotational axes 6 and 7 are made of metal and have high rigidity.

On the peripheral surfaces of the rotational axes 6 and 7, an upper (preceding) knife cylinder 2 and a lower (following) knife cylinder 3, which have cylindrical shapes, are attached via radial posts. The upper knife cylinder 2 and the lower knife cylinder 3 are made of a material, for example, CFRP (Carbon Fiber Reinforced Plastic: called carbon fiber for short), with high rigidity but with small $GD^2$ (rotational inertial force). Such shapes and materials of the rotational axes 6 and 7 and the upper and lower knife cylinders 2 and 3 reduce $GD^2$, thereby making it possible to realize rotation control superior in responsibility and rapidity.

In the previous art, the upper and lower knife cylinders 2 and 3 are made of a material with large $GD^2$, and preload generated by the rotational inertial force and by a bend of one of the upper and lower knives provides a pressing force necessary for cutting off the band-like paper D. As will be described below, however, torque given by the upper (preceding) knife driving motor 12 and the lower (following) knife driving motor 13 provides a cutting force in the present embodiment, so that the upper knife cylinder 2 and the lower knife cylinder 3 can be made of a material with small $GD^2$ (rotational inertial force).

On the peripheral surface of the upper knife cylinder 2, an upper (preceding) knife 4 with a vertical edge, which faces outwards in the radial direction, is attached in the helical form. On the peripheral surface of the lower knife cylinder 3, a lower (following) knife 5 with a horizontal edge, which extends in the peripheral direction, is attached in helical form. When cutting band-like paper D, such as a corrugated fiberboard web, the upper knife 4 and the lower knife 5 operate in cooperation. More specifically, the band-like paper is sandwiched between the upper knife 4 and the lower knife 5, which are pressed against each other. The point at which the edges of the two knives come into contact with each other moves from one of the ends of the band-like paper to the other end thereof, whereby the band-like paper is cut off. Here, in FIG. 1 and FIG. 2, reference character S designates the leading end (the cutting start point) of the upper and lower knives, and reference character E designates the terminal end (the cutting end point) of the upper and lower knives.

The previous art employs a knife cylinder with high rigidity to apply preload to the edge of the knife for a cutting operation. As described so far, however, according to the present embodiment, the upper knife 4 and the lower knife 5 engage in the direction in which the edge of the upper knife 4 and the edge of the lower knife 5 come into contact with each other, whereby the band-like paper D is cut, so that the preload is considerably reduced and adjustment of the edges of the knives can be roughly (easily) performed. Further, as will be described below, as torque is given to each of the cylinders, the rigidity of each knife cylinder 2 and 3 and their $GD^2$ are reduced. In addition, in contrast to the previous art in which cutting load corresponding to the maximum basis weight is always applied, the present embodiment is capable of changing the cutting load (torque) depending upon the basis weight of the band-like paper D, so that the life-time of each knife 4 and 5 is increased.

Here, FIG. 2 exaggerates the upper knife 4 and the lower knife 5 for purposes of illustration, and in an actual case, the diameters of the upper knife cylinder 2 and the lower knife cylinder 3 are significantly large. A helical recess is provided on a part of each knife cylinder 2 and 3, and the upper knife 4 and the lower knife 5 are fitted into the recesses.

Further, the upper knife 4, the lower knife 5, the upper knife cylinder 2, the lower knife cylinder 3, the rotational axes 6 and 7 can be constructed in the following way. That is, each of the upper knife cylinder 2 and the lower knife cylinder 3 is a hollow cylindrical member made of carbon fiber reinforced plastic with disk-like lids at the opposite ends thereof (or formed in one piece). At the centers of the lids, rotational axes 6 and 7 made of metal are bonded or fixed with bolts and nuts, etc. On the peripheral surface of the upper knife cylinder 2 and the lower knife cylinder 3, which have cylindrical shapes made of carbon fiber reinforced plastic, holders made of aluminum or iron or carbon fiber reinforced plastic are attached. On each of the holders, the upper knife 4 and the lower knife 5 are mounted respectively in helical form with bolts and nuts, etc. Further, at the opposite ends of the upper knife cylinder 2 and the lower knife cylinder 3 with a hollow cylindrical shape made of carbon fiber reinforced plastic, rotational axes 6 and 7 with metal lids can be fixed.

On one end (the right part of FIG. 1) of the rotational axis 6, an upper (preceding) gear 8 including split gears 8*a* and 8*b* is attached. On one end (the right part of FIG. 1) of the rotational axis 7, the lower (following) gear 9 which has a meshing engagement with the upper gear 8 is attached. Two split gears 8*a* and 8*b* are fixed to the rotational axis 6 slightly shifted from each other in the rotational direction, so that backlash in meshing engagement with the lower gear 9 while the upper knife 4 and the lower knife 5 are not in contact with each other is prevented. In this instance, the upper gear 8 can be formed as a single gear and the lower gear 9 can be formed by two split gears. Further, the upper gear 8 or the lower gear 9 is not necessarily formed by two gears, and each of the upper gear 8 and the lower gear 9 can be prepared as a single gear.

An upper (preceding) knife driving motor 12 is connected to the upper gear 8 via an upper (preceding) drive gear 10, which has a meshing engagement with the upper gear 8. A lower (following) knife driving motor 13 is connected to the lower gear 9 via a lower (following) drive gear 11 which has a meshing engagement with the lower gear 9. These knife driving motors 12 and 13 are torque motors with the same rated capacity and the same output power, and these motors 12 and 13 are individually controlled by a cut off control device 20. Either one (for example, the lower knife driving motor 13) of these motors 12 and 13 is attached with an encoder 14 which detects the rotational speed of the motor.

The upper gear 8 and the lower gear 9 have the following characteristic features. The upper gear 8 and the lower gear 9 have a meshing engagement with each other without backlash in a range thereof in which the upper knife 4 and the lower knife 5 do not come into contact with each other. As shown in FIG. 3 and FIG. 4, in a range (from the cutting start point C to the cutting end point O) in which the upper knife 4 and the lower knife 5 come into contact with each other, thereby carrying out a cutting operation, one of the opposite sides of the teeth of at least one of the split gears 8*a* and 8*b*, which side faces the teeth of the lower gear 9 when pressure (given) torque Txat and Txbt is applied, is cut as shown with shaded areas in FIG. 3 and FIG. 4. In this manner, at least in a range from the cutting start point C to the cutting end point O, the edges of the upper knife 4 and the lower knife 5 come into contact with each other, but the teeth of the upper gear 8 and the lower gear 9 do not come into contact with each other.

Here, the cutting start point C and the cutting end point O depend on the width B of the band-like paper D. Accordingly, in a range from the leading end (cutting start point) S of the upper and lower knives to the terminal end (cutting end point) E of the upper and lower knives, shaded areas in FIG. 3 and FIG. 4 are cut.

With this arrangement, it becomes possible for the upper knife driving motor 12 and the lower knife driving motor 13 to operate in synchronization with each other with reliability when the upper knife 4 and the lower knife 5 do not come into contact with each other. Further, when the upper knife 4 and the lower knife 5 come into contact with each other, thereby carrying out a cutting operation (or when the upper knife 4 and lower knife 5 are in contact with each other), the upper gear 8 and the lower gear 9 do not have a mesh engagement with each other. Thus, the upper knife driving motor 12 and the lower knife driving motor 13 can be controlled separately, thereby providing an appropriate pressing force between the upper knife 4 and the lower knife 5, so that an optimum cutting force is realized for the band-like paper D.

Here, if each of the upper gear 8 and lower gear 9 is provided as a single gear, one of the opposite sides of the teeth of at least one of the upper gear 8 and the lower gear 9, which teeth are arranged in a range from the cutting start point C to the cutting end point O [or a range from the leading end (cutting start point) S to the terminal end (cutting end point) E of the upper and lower knives], should be cut. Further, at least either one of the upper gear 8 and the lower gear 9 can be formed so as not to have any teeth in a range from the cutting start point C to the cutting end point O. Furthermore, the width of all the teeth of either one of the upper gear 8 and the lower gear 9 can be reduced.

Here, if the teeth of the upper gear 8 and the lower gear 9 in a range from the leading end S of the upper and lower knives to the terminal end E of the upper and lower knives are cut (or removed) (that is, backlash is provided for the upper gear 8 and the lower gear 9 in a range from the leading end S of the upper and lower knives to the terminal end E of the upper and lower knives), there is a possibility that the lower (following) knife 5 precedes the upper (preceding) knife 4 (that is, "inverse edge" occurs). In particular, when the timing with which torque control is started is incorrect, inverse edge often occurs.

Therefore, to prevent the occurrence of the inverse edge, the teeth of the upper gear 8 and the lower gear 9 in a range (specified distance) corresponding to a specified length (the lengths of the edges of the upper and lower knives in the axial direction) Q from the leading end S of the upper and lower knives should not be cut (or removed). That is, backlash is not provided for the upper gear 8 and the lower gear 9 in a range corresponding to the specified length Q from the leading end S of the upper and lower knives. In addition, backlash is provided in a range from the point after passing the specified length to the terminal end E of the upper and lower knives.

As a result, the occurrence of inverse edge between the upper and lower knives is prevented at initiation of a cutting operation, so that damage to the upper and lower knives are prevented and a high-quality and accurate cutting operation can be realized.

In this instance, if the specified length Q is significantly shorter than about 100 mm, there is a possibility that the inverse edge prevention effect cannot be exerted. Further, if the specified length is significantly longer than 200 mm, there is a possibility that cutting effect which should be realized by torque control is not exerted. Thus, the specified length Q preferably falls within a range of about 100 mm to 200 mm from the leading end of the upper and lower knives.

Here, FIG. 3 and FIG. 4 are schematic views, in which the upper knife 4 and the lower knife 5 are separated from each other. In a practical case, however, the upper knife 4 and the lower knife 5 are provided in the vicinity of the teeth of the upper gear 8 and the lower gear 9 as shown in FIG. 2, and the edges of the upper knife 4 and the lower knife 5 are arranged so as to come into contact with each other.

Further, the cut off apparatus shown in FIG. 1 and FIG. 2 has the upper knife 4 with a vertical edge and the lower knife 5 with a horizontal edge. The present invention, however, should by no means be limited to this, and the vertical and horizontal edges can be exchanged. Further, both of the knives can have vertical edges or horizontal edges.

Next, referring to FIG. 5, FIG. 6(A) through FIG. 6(E), and FIG. 7, a description will be made of a cut off control device 20 which cuts off band-like paper, such as a corrugated fiberboard web, in a corrugating machine which manufactures corrugated fiberboard sheets or the like according to the present embodiment. The corrugating machine which manufactures corrugated fiberboard sheets, etc. has a production management device 40 that manages and controls the production of the whole corrugating machine.

The production management device 40 includes: a keyboard (input unit) for inputting therethrough the basis weight (or material, thickness, width, etc.) of band-like paper D such as a corrugated fiberboard sheet, the length L of a sheet to be cut off, the paper feeding speed Vs (or the number of sheets to be cut off per unit time); a display; a memory which records various types of data; and a Central Processing Unit (CPU). By inputting the basis weight W of band-like paper D such as corrugated fiberboard sheets to be cut off and the sheet length to be cut off, it is possible to change various setting values.

In this instance, a non-illustrated paper feeding device which feeds band-like paper D, such as a corrugate fiberboard web, to the cut off apparatus is provided with a paper feed control device 41. On the basis of paper feeding speed Vs which is sent from the production management device 40, the paper feed control device 41 controls the paper feeding speed in which the band-like paper D is fed.

On the other hand, the cut off apparatus is provided with a cut off control device 20, which includes: an instruction value computing unit 21 for generating various types of patterns; an upper (preceding) knife speed control unit 30 for controlling drive current applied to the upper knife driving motor 12; and a lower (following) knife speed control unit 35 for controlling drive current applied to the lower knife driving motor 13. The production management device 40 sends the paper feeding speed Vs, the sheet length L to be cut off, and the basis weight W, to the cut off control device 20.

The instruction value computing unit 21 includes: a speed pattern generator 24 for generating speed patterns; a to-be-given torque pattern generator 25 for generating a torque pattern for cutting off band-like paper D; and a cutting torque computing unit 23 for computing necessary torque for a cut off operation.

Figure 6A:
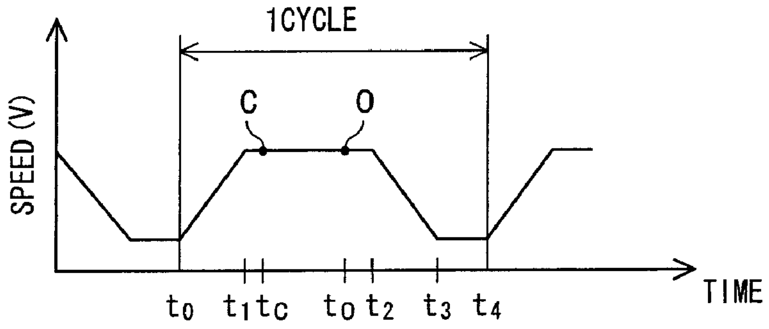
FIG. 6(A) through FIG. 6(E) are diagrams each showing a control pattern for each knife driving motor according to the present embodiment.
Figure 6B:
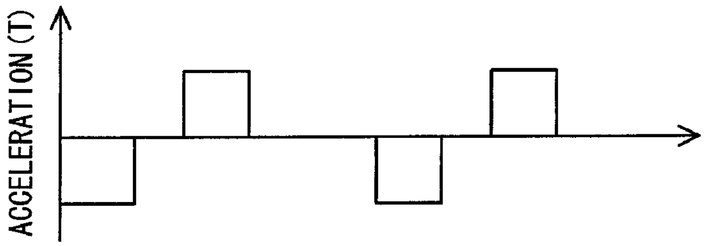
Figure 7:
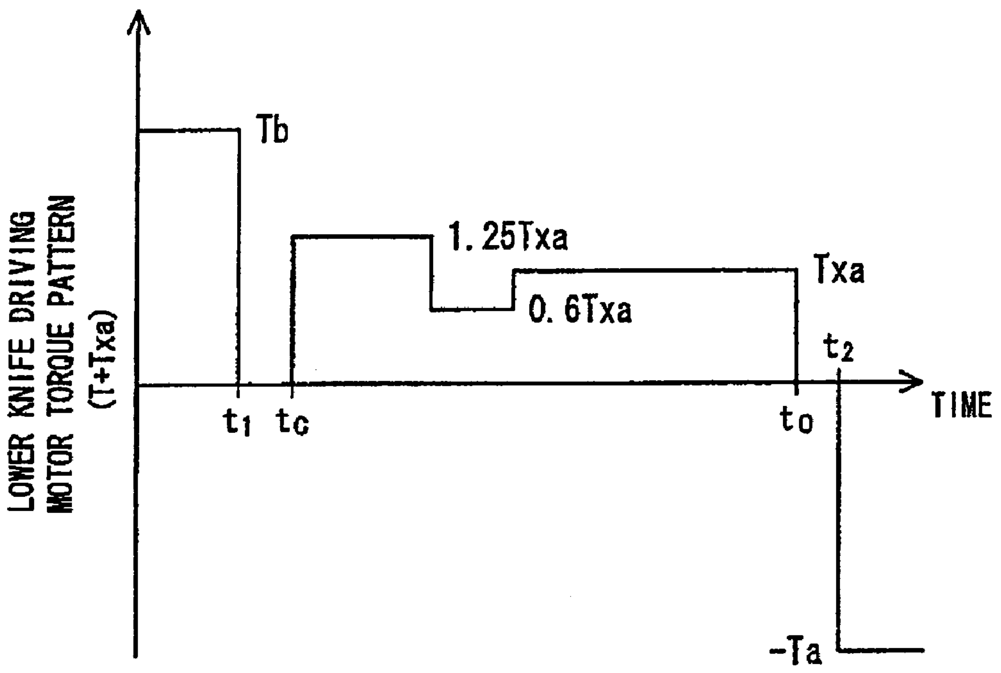
FIG. 7 is a diagram showing another example of a torque pattern given by each knife driving motor according to the present invention.
Figure 8:
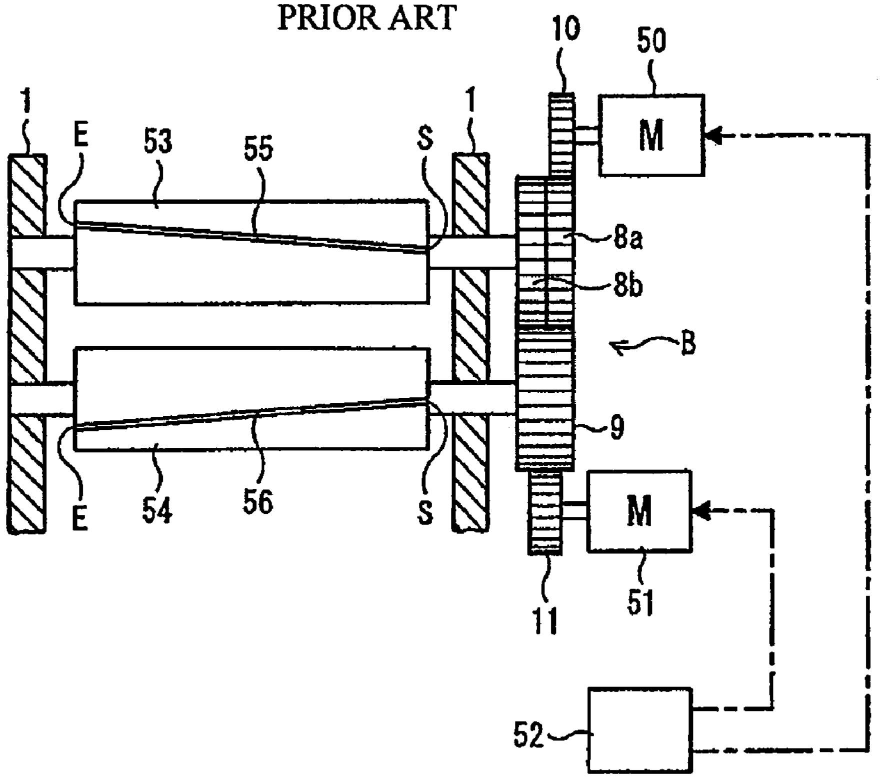
FIG. 8 PRIOR ART
FIG. 8 is a schematic front view showing a previous cut off apparatus.

The speed pattern generator 24 receives the paper feed speed Vs and the sheet length to be cutoff for band-like paper D from the production management device 40, and generates a speed pattern shown in FIG. 6(A). That is, on the basis of the paper feeding speed Vs and the sheet length to be cut off, start time t1 of joining between the upper knife 4 and the lower knife 5, start time tc of a cutting operation, completion time to of a cutting operation, time t2 at which joining is completed and deceleration is started, time t3 at which deceleration is completed and standby is started, time t4 at which one cycle is completed, are computed for one cycle. Further, the speeds in a speed-up step (t0 through t1), a knife joining step (t1 through t2), a speed-down step (t2 through t3), a standby step (t3 through t4), are also computed.

Here, during the standby time (t3 through t4), the speed can be zero. Further, in cases where the paper feeding speed Vs is large and the sheet length to be cut off is long, the speed can be greater in the standby time (t3 through t4) than in the cutting time (time between tc and to). In this manner, the speed pattern shown in FIG. 6(A) is generated, and the generated speed pattern is stored in an unillustrated storage device. Further, the cutting start time tc and the cutting completion time to are sent to the to-be-given torque pattern generator 25.

During a cutting operation of band-like paper D, the position computing unit 22 receives the detection speed St detected by an encoder 14 attached to the lower knife driving motor 13. The detection speed St is integrated, whereby the current position Pt of the upper knife 4 and the lower knife 5 and elapsed time t elapsed from the start time t0 of one cycle is calculated. Then, the speed pattern generator 24 computes the speed instruction value Vt at the elapsed time t based on the recorded speed pattern. This calculated speed instruction value Vt is sent to the comparator 31.

Next, the cutting torque computing unit 23 receives the paper feeding speed Vs and the basis weight of the band-like paper D from the production management device 40, and computes cutting torque (Txa+Txb) necessary for cutting the band-like paper D having the basis weight W at the paper feeding speed Vs by means of the upper knife driving motor 12 and the lower knife driving motor 13.

Here, the cutting torque (Txa+Txb) is changed with change in the paper feeding speed Vs and in the width B of the band-like paper. Further, the value of cutting torque (Txa+Txb) should be large enough to resist a cut-off reactive force added from the band-like paper D to the upper and lower knives 4 and 5, and also to give an appropriate contact force to the upper and lower knives 4 and 5. This contact force is preferably 100 kgf to 300 kgf in the horizontal direction.

With this arrangement, when the band-like paper D is cut, a contact force is caused between the upper knife 4 and the lower knife 5 so that an edge gap between the upper knife 4 and the lower knife 5 is suppressed to a value equal to or smaller than a limit value which can be used in a cutting operation. The computed cutting torque (Txa+Txb) is sent to the to-be-given torque pattern generator 25.

Figure 6C:
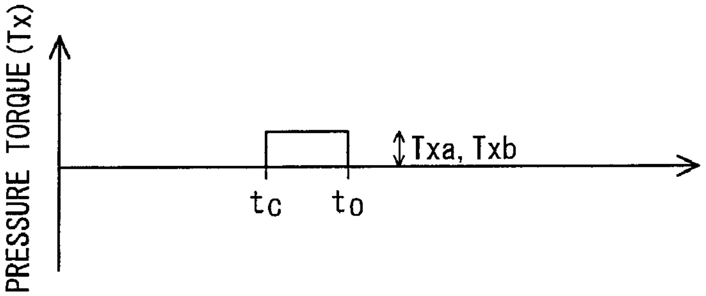

The to-be-given torque pattern generator 25 generates a to-be-given torque pattern shown in FIG. 6(C) based on the cutting torque (Txa+Txb), necessary for a cutting operation, sent from the cutting torque computing unit 23, the cutting start time tc, and the cutting completion time to, and stores the generated torque pattern in an unillustrated storage device. In the to-be-given torque pattern shown in FIG. 6(C), the cutting torque Txa necessary for the upper knife driving motor 12 and the cutting torque Txa necessary for the lower knife driving motor 13 have the same rectangular shape. In this instance, the above to-be-given torque pattern can have a trapezoidal shape with increase from t1 to tc and decrease from to to t2. Further, the cutting torques Txa and Txb can start to be given before the joining start time t1 (for example, immediately before the upper and lower knives come into contact with each other). Here, as already described, backlash is not provided for the upper gear 8 and the lower gear 9 in a range corresponding to a specified length Q from the leading end S of the upper and lower knives, and backlash is provided in a range after passing the specified length Q to the terminal end E of the upper and lower knives. Further, the cutting torque Txa and Txb are applied before the joining start time t1, whereby inverse edges can be reliably prevented at the initiation of a cutting operation.

It is preferable that the cutting torque Txa and the cutting torque Txb have the same absolute value (that is, torque pattern given to the upper knife driving motor 12 and the lower knife driving motor 13 have an identical shape and are of opposite signs). This makes it possible to accurately cut the band-like paper D, with no effect on the paper feeding of the band-like paper D at the time the paper D is cut.

However, the absolute values of torque need not always be equal, and one of the cutting torques Txa and Txb of the upper knife driving motor 12 and the lower knife driving motor 13 can be larger within a range allowed by the rate capacity of the upper knife driving motor 12 and the lower knife driving motor 13. Here, the meaning of the rate capacity of each torque motor of the present embodiment includes not only a permissible successive fixed power capacity but also a permissible short time overload power capacity.

The torque pattern with a rectangular shape in FIG. 6(C) is for a case where the cutting speed (paper feeding speed Vs) is low or intermediate, and the torque is constant in all the range of the speed. However, if the cutting speed is high, the torque pattern shown in FIG. 7 can be employed. If the cutting speed is high, the lower knife 5 is given a cutting torque of 1.25·Txa (this is referred to as initial-period high cutting torque) which is 1.25 times as large as the torque necessary at the time Tc of initiation of a cutting operation as shown in FIG. 7. After that, the cutting torque is decreased to 0.6 times as large as the cutting torque 0.6Txa (this is referred to as middle-period low cutting torque). Then, in the latter half, the cutting torque is increased again up to about one time as large as the cutting torque Txa (this is referred to as terminal-period normal cutting torque). Thus, the torque has a torque pattern with such a polygonal shape. With this torque pattern having a polygonal shape, it becomes possible to realize an accurate cutting operation when the cutting speed is high. Here, FIG. 7 shows a torque pattern for the lower knife driving motor 13. The upper knife driving motor 12 has a torque pattern which has the same shape but is inverse in sign. As a to-be-given torque pattern, other arbitrary shapes than the above rectangular shape or the above shape with projections and depressions are available.

The initial-period high cutting torque is 1.1- to 1.5-times cutting torque (1.1·Txa to 1.5·Txa). The middle-period low cutting torque is 0.6-times to 0.9-times cutting torque (0.6·Txa to 0.9·Txa). The terminal-period normal cutting torque is 0.9-times to 1.1-times cutting torque (0.9·Txa to 1.1·Txa).

Then, on the basis of the stored to-be-given torque pattern, the to-be-given torque instruction values Txat and Txbt at the elapsed time t sent from the position computing unit 22 are calculated. The to-be-given torque instruction value Txbt for the upper knife driving motor 12 is sent to a torque subtractor 33, and the to-be-given torque instruction value Txat for the lower knife driving motor 13 is sent to the a torque adder 36.

The comparator 31 receives the speed instruction value Vt sent from the speed pattern generator 24 and the detection speed St sent from the encoder 14 and compares these values. The speed deviation Vt−St which is to be increased or decreased, as an operation result, is sent to an instruction torque computing unit 32.

The instruction torque computing unit 32 receives the speed Vt−St to be increased or decreased, sent from the comparator 31, and computes a rotational torque instruction value Tt to be output to the upper knife driving motor 12 and the lower knife driving motor 13. The computed rotational torque instruction value Tt is output to the torque subtractor 33 and the torque adder 36. In this case, the output pattern of the rotational torque instruction value Tt is such as that shown in FIG. 6(C). In this manner, the comparator 31 and the instruction torque computing unit 32 perform feedback control.

The torque subtractor 33 receives the rotational torque instruction value Tt sent from the instruction torque computing unit 32 and the to-be-given torque instruction value Txbt sent from the to-be-given torque pattern generator 25, performs a subtraction therebetween, and sends the output torque instruction value Tt−Txbt to be output by the upper knife driving motor 12 to the upper (preceding) power amplifier 34. In this case, the output torque instruction value Tt−Txbt has a pattern shown in FIG. 6(E). The upper power amplifier 34 computes output current based on the output torque instruction value Tt−Txbt and gives the driving current to the upper knife driving motor 12.

On the other hand, the torque adder 36 receives the rotational torque instruction value Tt sent from the instruction torque computing unit 32 and the to-be-given torque instruction value Txat sent from the to-be-given torque pattern generator 25, and performs an addition therebetween, and sends the output torque instruction value Tt+Txat to be output by the lower knife driving motor 13 to the lower (following) power amplifier 37. In this case, the output torque instruction value Tt−Txat has a pattern shown in FIG. 6(D). The lower power amplifier 37 computes output current based on the output torque instruction value Tt+Txat and gives the driving current to the lower knife driving motor 13.

The upper (preceding) power amplifier 34 and the lower (following) power amplifier 37 amplify the torque instructions and generate actual output current to each servo motor.

Figure 6D:
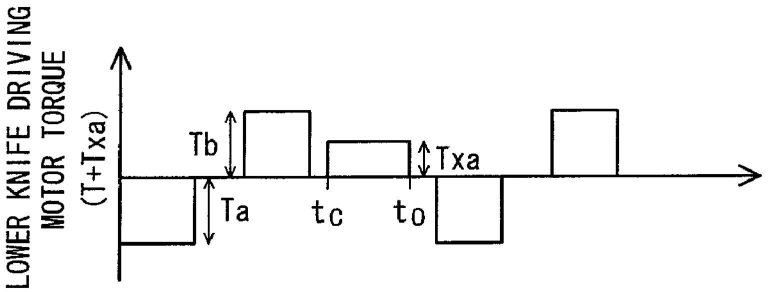
Figure 6E:
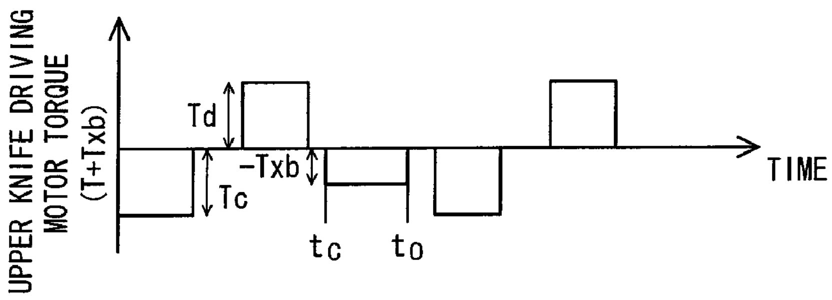

In this case, as shown in FIG. 6(D) and FIG. 6(E), the to-be-given torque instruction values Txat and Txbt are smaller than torque Ta, Tb, Tc, and Td necessary for motor acceleration or deceleration. It is unnecessary to increase the rated capacity of each motor by giving a cutting force to the upper knife driving motor 12 and the lower knife driving motor 13. In addition, the upper power amplifier 34 and the lower power amplifier 37 can have the same rated capacity.

In this manner, in the acceleration step (from t0 to t1), the deceleration step (from t2 to t3), and the standby step (from t3 to t4), the upper knife driving motor 12 and the lower knife driving motor 13 operate in synchronism with each other. In the cutting step of the band-like paper D (from tc to to) or the contact step of the knives (from t1 to t2), the upper knife driving motor 12, as shown in FIG. 3, applies force in the direction which makes the upper knife 4 move backward, that is, in the direction which pushes the lower knife 5.

In contrast, the lower knife driving motor 13 applies force in the direction which makes the lower knife 5 move forward, that is, in the direction which pushes the upper knife 4. In this manner, by means of the upper knife driving motor 12 and the lower knife driving motor 13, torque is given to the upper knife 4 and the lower knife 5 in the direction in which these knives are pressed against each other, whereby a cutting force for cutting the band-like paper D is produced.

In this case, if the to-be-given torque instruction values Txat and Txbt, which are given to the upper knife driving motor 12 and the lower knife driving motor 13, respectively, are the same, torque given to the upper knife driving motor 12 and torque given to the lower knife driving motor 13 are cancelled. Thus, force required to increase or decrease the paper feeding speed Vs is not caused, and hence the paper feeding speed is not influenced. As a result, only force necessary for cutting is applied, so that accurate and correct cutting of the band-like paper D is realized.

With the above arrangement, when the bank-like paper is cut, clearance between the upper knife 4 and the lower knife 5 falls within a permissive range, and adjustment of a cutting force is facilitated, so that an accurate cutting operation is performed with high reliability. In addition, even if the upper knife cylinder 2 or the lower knife cylinder 3 is bent, the upper knife driving motor 12 and the lower knife driving motor 13 appropriately give a pressing force necessary for the cutting operation, so that the upper knife cylinder 2 and the lower knife cylinder 3 with a small rotational inertial force are realized. This makes it possible to use knife driving motors 12 and 13 and power amplifiers 34 and 37 with small capacities.

In the above description, the cut off apparatus and the control apparatus for the same are described. However, the present invention should by no means be limited to the above embodiment, and various changes or modifications may be suggested without departing from the gist of the invention. For example, although the upper knife 4 proceeds the lower knife 5 in the above embodiment, the lower knife 5 can precedes the upper knife 4.

Further, the above position computing unit 22, cutting torque computing unit 23, speed pattern generator 24, to-be-given torque pattern generator 25, upper knife speed control unit 30, comparator 31, instruction torque computing unit 32, instruction torque subtractor 33, lower knife speed control unit 35, and instruction torque adder 36, are realized in the form of electrical circuits. However, all of these can be realized as a computer program (or sequence), and the above computing unit, generator, controller, comparator, adder, and subtractor can be realized as a sub-program (or sub-sequence).

INDUSTRIAL USABILITY

Since it is possible to accurately cut off band-like paper such as a corrugated fiberboard sheet, the present invention is considerably useful.

The invention claimed is:

1. A cut off control device for a corrugated fiberboard web, wherein said control device controls a preceding knife driving motor for rotationally driving a preceding knife cylinder on whose peripheral surface a preceding helical knife is provided and also a following knife driving motor for rotationally driving a following knife cylinder on whose peripheral surface a following helical knife is provided, said control device comprising:

a speed pattern generator, to which a feeding speed of the corrugated fiberboard web and a sheet length to be cut off is input, for generating rotational speed patterns of the preceding knife driving motor and the following knife driving motor based on the input feeding speed and the input sheet length to be cut off and for outputting a speed instruction value;

a comparator which compares the speed instruction value from said speed pattern generator with a detected speed of the preceding knife driving motor or the following knife driving motor;

an instruction torque computing unit which computes rotational torque instruction values for the preceding knife driving motor and the following knife driving motor based on a signal from said comparator;

a cutting torque computing unit which computes cutting torque of the preceding knife driving motor and the following knife driving motor;

a to-be-given torque pattern generator which distributes the cutting torque sent from said cutting torque computing unit, and generates a to-be-given torque pattern based on the feeding speed of the corrugated fiberboard web and the sheet length to be cut off, and outputs a to-be-given torque instruction value;

an instruction torque subtractor unit which subtracts the to-be-given torque instruction value, output from said to-be-given torque pattern generator, from the rotational torque instruction value computed by said instruction torque computing unit;

a preceding power amplifier which controls the preceding knife driving motor based on a computation result obtained by said instruction torque subtractor;

an instruction torque adder which adds the rotational torque instruction value, computed by said instruction torque computing unit, to the to-be-given torque instruction value computed by said to-be-given torque pattern generator; and a following power amplifier which controls the following knife driving motor based on a computation result obtained by said instruction torque adder.

2. A cut off control device as set forth in claim 1, wherein said cutting torque computed by said cutting torque computing unit has a cutting torque value necessary for cutting off the corrugated fiberboard web, said cutting torque value being based on a basis weight of the corrugated fiberboard web and the input feeding speed.

3. A cut off control device as set forth in claim 1, wherein said cutting torque computed by said cutting torque computing unit is large enough to resist a cut-off reactive force added from the corrugated fiberboard web to the preceding and following knives, and also to give an appropriate contact force to the preceding and following knives.

4. A cut off control device as set forth in claim 1, wherein said to-be-given torque pattern generated by said to-be-given torque pattern generator is a pattern having a rectangular shape, a trapezoidal shape, or a polygonal shape.

5. A cut off control device as set forth in claim 1, wherein said to-be-given torque pattern generator changes the pattern of the to-be-given torque depending on the feeding speed.

6. A cut off control device as set forth in claim 1, wherein said to-be-given torque pattern generator generates an identical to-be-given torque pattern for the preceding knife driving motor and the following knife driving motor.

7. A cut off control device as set forth in claim 1, said cut off control device being connected to a production management device including an input unit for inputting thereto a basis weight of the corrugated fiberboard web and the sheet length to be cut off, which production management system (i) outputs the basis weight of the corrugated fiberboard web to said cutting torque computing unit, and (ii) computes the rotation speeds of the preceding and following knife cylinders based on the basis weight of the corrugated fiberboard web and the sheet length to be cut off, and (iii) outputs the resultantly obtained rotation speed to said speed pattern generator.

* * * * *